No. 787,585. PATENTED APR. 18, 1905.
S. E. & W. W. MORRAL.
MACHINE FOR CUTTING GREEN CORN FROM THE COB.
APPLICATION FILED JULY 7, 1903.
3 SHEETS—SHEET 1.
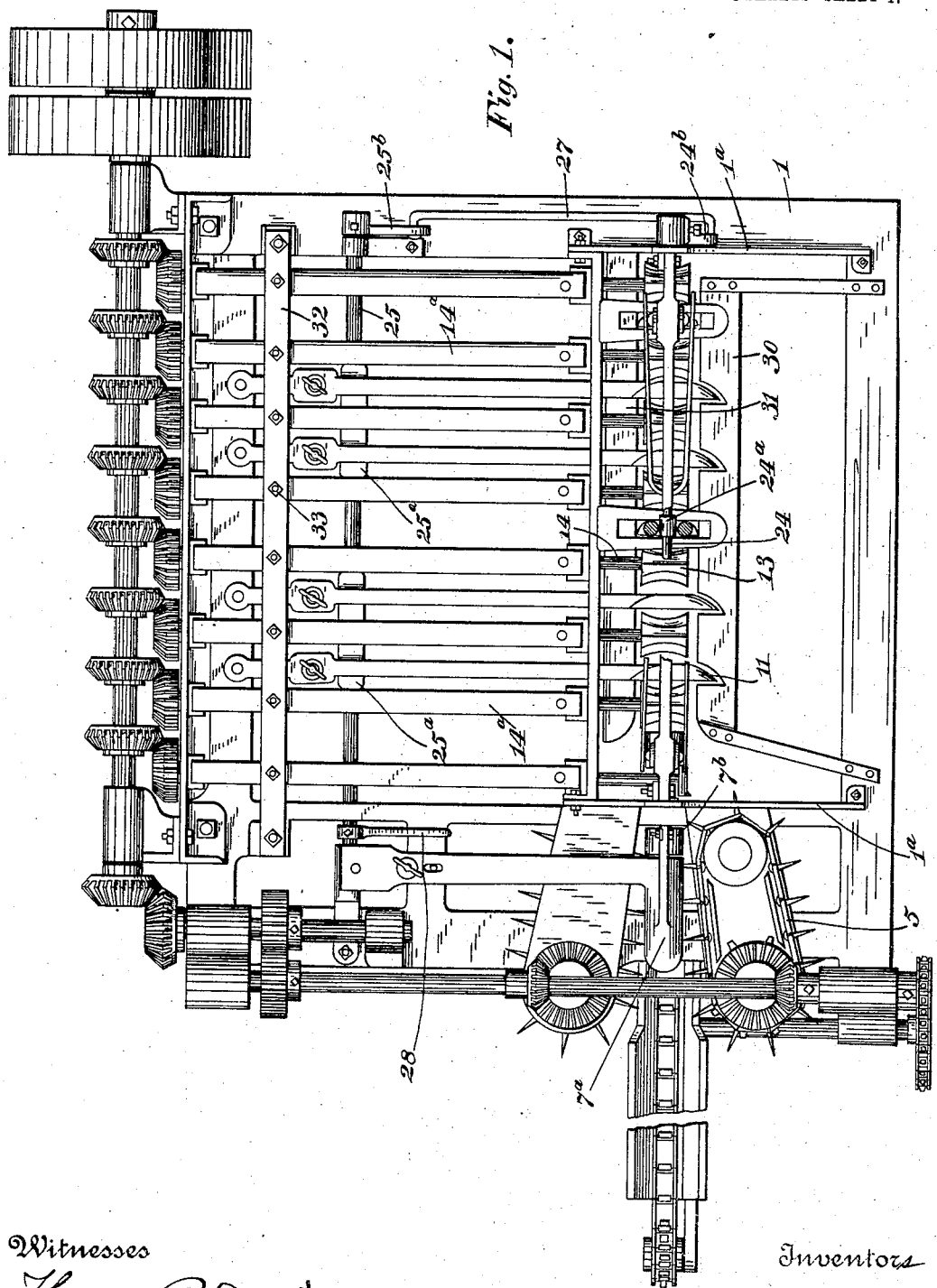
Witnesses
Thomas P. Davis
Thos. E. French
Inventors
Samuel E. Morral
William W. Morral
by Finckel & Finckel
their Attorneys No. 787,585. PATENTED APR. 18, 1905.
S. E. & W. W. MORRAL.
MACHINE FOR CUTTING GREEN CORN FROM THE COB.
APPLICATION FILED JULY 7, 1903.
3 SHEETS—SHEET 2.
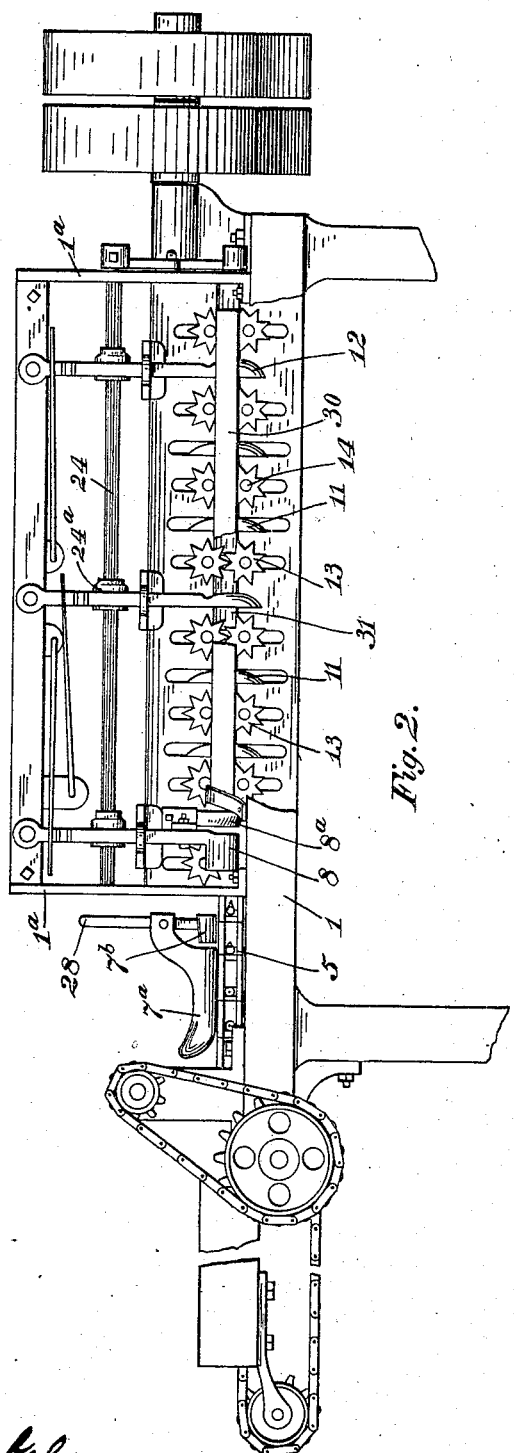
Witnesses
Benj. Finckel
Thos. P. Davis
Inventors
Samuel E. Morral
William W. Morral
by Finckel & Finckel
their Attorneys No. 787,585. PATENTED APR. 18, 1905.
S. E. & W. W. MORRAL.
MACHINE FOR CUTTING GREEN CORN FROM THE COB.
APPLICATION FILED JULY 7, 1903.
3 SHEETS—SHEET 3.
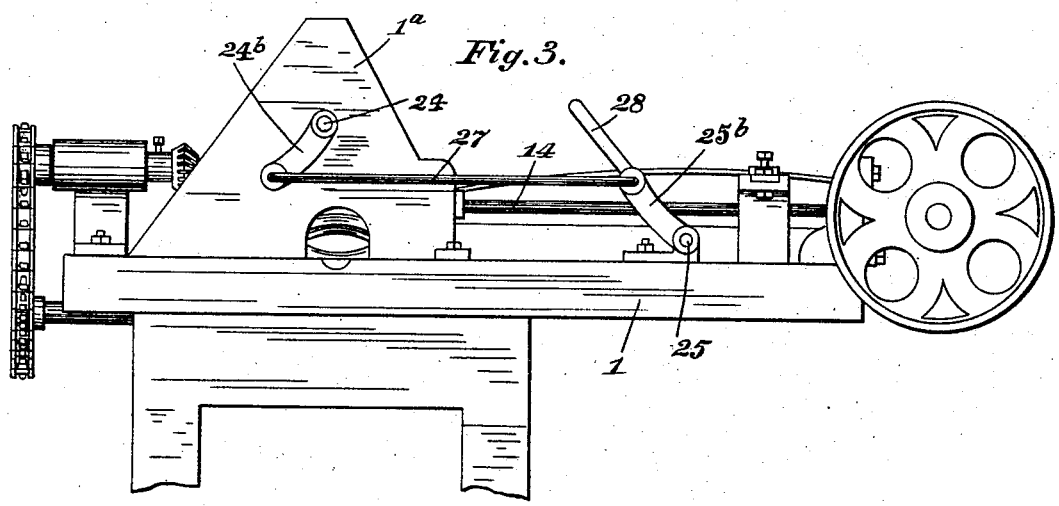
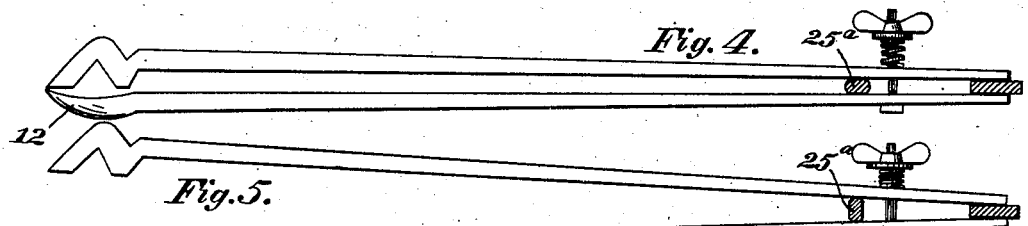
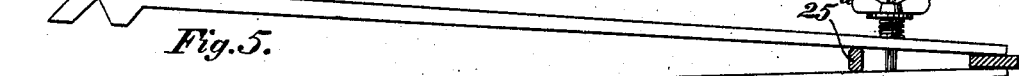
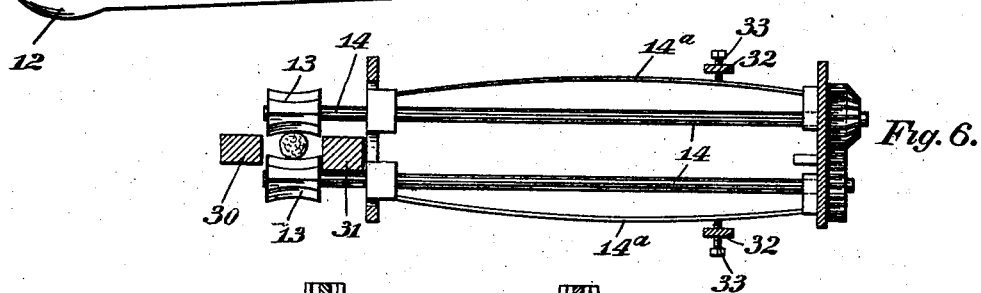
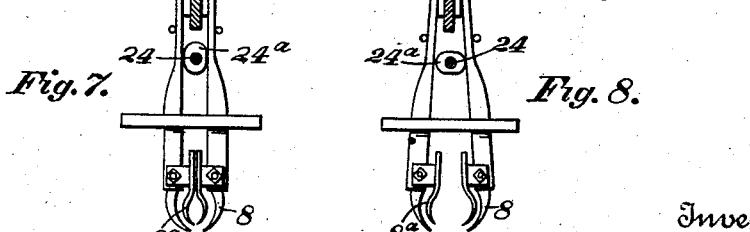
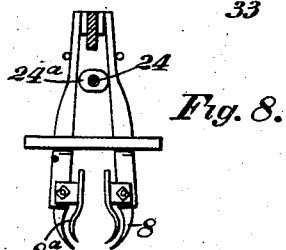
Witnesses
Thomas P. Davis
Thos. E. French
Inventors
Samuel E. Morral
William W. Morral
by Finckel & Finckel
their Attorneys No. 787,585.

Patented April 18, 1905.

UNITED STATES PATENT OFFICE.

SAMUEL E. MORRAL AND WILLIAM W. MORRAL, OF MORRAL, OHIO.

MACHINE FOR CUTTING GREEN CORN FROM THE COB.

SPECIFICATION forming part of Letters Patent No. 787,585, dated April 18, 1905.

Application filed July 7, 1903. Serial No. 164,521.

*To all whom it may concern:*

Be it known that we, SAMUEL E. MORRAL and WILLIAM W. MORRAL, citizens of the United States, residing at Morral, in the county of Marion and State of Ohio, have invented certain new and useful Improvements in Machines for Cutting Green Corn from the Cob; and we do hereby declare the following to be a full, clear, and exact description of the invention, such as will enable others skilled in the art to which it appertains to make and use the same.

This invention relates to the sort of machine shown and described in the Letters Patent of the United States No. 679,156, issued to us July 23, 1901.

We have learned that with the machine as shown in the patent referred to an ear of corn of abnormal size or shape will sometimes get stuck between the cutters, scrapers, or feed-wheels, and thus afford an obstruction to the ears following it, thereby clogging the machine, and while this occasions no special injury to the machine it entails a loss of time, because it is necessary to stop the machine in order to relieve it of the clogging-ears.

One of the objects of the present invention, therefore, is to provide means whereby the cutters and scrapers can be separated to permit the ready escape or removal of the clogging-ears.

Another trouble with the machine of the patent referred to is that ears would sometimes divert laterally from the normal route through the cutters and scrapers and fall out at the sides.

In the present machine we provide guides ranged on each side of the path of the cutters and scrapers to turn the ears inward into their proper course should they start outward.

A further defect (though by no means a fatal one) in the former machine was the tendency of the shafts bearing the ear-feeding wheels when spread apart by the ear to sag and get out of the horizontal line with the opening between the scrapers or cutters, and to remedy this we now provide each of the tension-springs of the feed-wheels with an independent adjusting device.

The invention resides in the parts and combination of parts pointed out in the claims.

In the accompanying drawings, Figure 1 is a top plan view, some parts being broken out and removed. Fig. 2 is a view in elevation of the right-hand side of Fig. 1, parts being broken out. Fig. 3 is an elevation of the rear end of the machine. Figs. 4 and 5 are edge views of scrapers, the former view showing them closed and the latter showing them separated. Fig. 6 is a view of a pair of feed wheels and shafts, showing the improved mode of adjusting the tension of their springs. Figs. 7 and 8 are side views of cutters in closed and opened position, respectively.

In the present machine the frame 1, the toothed feed-chains 5, the horizontal guides $7^a$ and cutters $7^b$, the vertical guides and cutters 8 and $8^a$, the horizontal scrapers 11 and vertical scrapers 12, and the feed-wheels 13 on shafts 14 are all substantially as shown in the former patent herein referred to and operate or are operated in substantially the same way and need not, therefore, be again described.

Journaled horizontally and longitudinally in vertical plates $1^a$, rising from the frame 1, so as to lie between the shanks or arms of the vertical cutters and scrapers is a shaft 24, having formed therewith or secured thereon eccentric enlargements or collars $24^a$, adapted when the said shaft is given a partial rotation to spread apart the cutters $8^a$ and scrapers 12, thereby enlarging the passage-way of the ear between them, and journaled on the top pieces of the frame 1 is another shaft, 25, extending across the machine parallel to the shaft 24, but at the opposite side of the machine and so as to lie between the shanks or arms of the horizontal scrapers 11. This shaft 25 is eccentrically enlarged or flattened at $25^a$, where it extends between said shanks, so that when the shaft is given a partial rotation the eccentric portions will spread the scrapers 11 asunder and enlarge the passage-way of the ear between them. The rear end of the shaft 24 is provided with a crank-arm $24^b$, and the corresponding end of the shaft 25 is provided with a similar crank-arm $25^b$, the said crank-arms being connected by a rod 27, so that the rocking of one shaft effects a corresponding rocking of the other to simultaneously separate or permit the closing of the cutters and scrapers. The front end of the shaft 25 is shown to be furnished with a handled lever 28, by which both the shafts 24 and 25 can be operated. With this construction the instant the attendant of the machine observes a clogged ear he operates the lever 28 to open the passage-way of the ears, whereupon the feed-wheels will carry the clogging-ear freely through and beyond position to obstruct the progress of the work.

30 designates the outer guide for directing the ears of corn back into their proper path between the cutters, scrapers, and feed-wheels should they tend to veer from that path. This guide is arranged in the horizontal plane of and parallel to said path and is supported by brackets attached to the main frame 1.

31 designates the companion guide for the opposite side of the route of the ears. This is conveniently located by placing it loosely on the shafts of the lower feed-wheels.

In the machine of our former patent herein referred to the tension of the springs $14^a$, acting on the shaft 14 of feed-wheels 13, was regulated by a yoke engaging springs of both upper and lower feed-wheels. The pressure of both upper and lower springs was therefore substantially the same, and when an ear of corn passed between the feed-wheels the lower spring bore the weight not only of the shaft of the upper feed-wheel, but also the added weight of the ear, and this weight tended to depress the opening between the feed-wheels below the horizontal straight line of the path of the ear through the machine, so that when the ear passed from a pair of feed-wheels it had to mount upward toward the cutters or scrapers. In the present machine the pressure of each spring $14^a$ on the shaft 14 is independently regulated, and for this purpose we secure longitudinally to the frame 1, above and below the springs 14, a stiff bar 32 and tap them with threaded holes to receive adjustable set-screws 33, the ends of which bear against the springs $14^a$. By turning the screws the pressure of any spring $14^a$ can be regulated independently of the others, and to overcome the difficulty of the depression of the opening between the feed-wheels below the straight-line path of the ears the lower springs can be stiffened by turning up the lower screws to afford the proper difference in pressure. The particular difference in pressure can be ascertained by watching a normal ear passing through the machine and the remedy applied by turning the adjusting-screws.

The scrapers and cutters herein, as in our former patent referred to, are each composed of two parts, one to act on each side of the ear, and when we speak of separating the scrapers and cutters we mean separating the parts composing the scraper or the parts composing the cutter.

What we claim, and desire to secure by Letters Patent, is—

1. In a machine for cutting green corn from the cob, the combination with a series of pairs of spring-held successively-acting cutters and scrapers, and a series of successively-acting intermediate pairs of ear-feeding wheels, of manual means mounted on the frame of the machine for simultaneously operating said cutters and scrapers to separate them to permit the free passage of ears between them.

2. In a machine for cutting green corn from the cob, the combination with vertically and horizontally arranged spring-held scrapers, of means adapted to positively separate the vertically-arranged scrapers, and means adapted to positively separate the horizontally-arranged scrapers, and manual means mounted on the frame of the machine for simultaneously operating both the aforesaid means.

3. In a machine for cutting green corn from the cob, the combination of a series of pairs of cutters and scrapers, and a series of pairs of intermediate feed-wheels arranged to feed the ears through said cutters and scrapers, of guide-bars arranged longitudinally on each side of and parallel to the path of movement of the ears through the series of feed-wheels adapted to direct veering ears into the proper path through said wheels and scrapers.

4. In a machine for cutting green corn from the cob, the combination of cutters and scrapers, pairs of feed-wheels between them, each member of said pairs of feed-wheels being movable vertically, a separate spring for each member of each pair of feed-wheels to press each toward the other, and a separate device for each of said springs adapted to regulate the pressure thereof independently of the other.

In testimony whereof we affix our signatures in presence of two witnesses.

SAMUEL E. MORRAL.
WILLIAM W. MORRAL.

Witnesses:
SHELDON W. WARNER,
HARRY SAVAGE.